(12) United States Patent
Lai et al.

(10) Patent No.: US 11,580,947 B2
(45) Date of Patent: Feb. 14, 2023

(54) SOUNDPROOF MEMBER

(71) Applicant: Industrial Technology Research Institute, Hsinchu (TW)

(72) Inventors: Yu-Lun Lai, Tainan (TW); Chih-Han Hsu, Miaoli (TW); Chung-Wei Fu, Kaohsiung (TW); Ren-Ting Huang, Yilan County (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 476 days.

(21) Appl. No.: 16/712,106

(22) Filed: Dec. 12, 2019

(65) Prior Publication Data
US 2021/0174779 A1 Jun. 10, 2021

(30) Foreign Application Priority Data
Dec. 5, 2019 (TW) .................. 108144468

(51) Int. Cl.
*B32B 3/24* (2006.01)
*G10K 11/162* (2006.01)
(Continued)

(52) U.S. Cl.
CPC ............ *G10K 11/162* (2013.01); *B32B 3/266* (2013.01); *B32B 9/007* (2013.01); *B32B 9/045* (2013.01);
(Continued)

(58) Field of Classification Search
CPC ... G10K 11/168; G10K 11/165; G10K 11/172
(Continued)

(56) References Cited

U.S. PATENT DOCUMENTS 6,179,086 B1 * 1/2001 Bansemir ............. G10K 11/172
181/290
6,220,388 B1 * 4/2001 Sanborn ................ E04B 9/0457
181/290

(Continued)

FOREIGN PATENT DOCUMENTS

CN       201254765 Y     6/2009
CN       102206387 A    10/2011
(Continued)

OTHER PUBLICATIONS

Lu et al., "A lightweight low-frequency sound insulation membrane-type acoustic metamaterial", AIP Advances, vol. 6, 2016, pp. 025116-1-025116-10, 11 pages.
(Continued)

*Primary Examiner* — William P Watkins, III
(74) *Attorney, Agent, or Firm* — Birch, Stewart, Kolasch & Birch, LLP

(57) ABSTRACT

A soundproof member is provided. The soundproof member includes a structural element, and a first composite film which is disposed on the bottom surface of the structural element. The structural member includes at least one through hole and the through hole passes through the structural element. The first composite film includes a polymer material and an inorganic nanoscale material, wherein the inorganic nanoscale material is a one-dimensional inorganic nanoscale material or a two-dimensional inorganic nanoscale material.

20 Claims, 11 Drawing Sheets

(51) Int. Cl.
*B32B 3/26* (2006.01)
*B32B 9/00* (2006.01)
*B32B 9/04* (2006.01)
*B32B 27/34* (2006.01)

(52) U.S. Cl.
CPC .......... *B32B 27/34* (2013.01); *B32B 2307/10* (2013.01); *Y10T 428/24273* (2015.01); *Y10T 428/24298* (2015.01); *Y10T 428/24331* (2015.01)

(58) Field of Classification Search
USPC ........................................................ 181/292
See application file for complete search history.

(56) References Cited

U.S. PATENT DOCUMENTS

| | | | |
|---|---|---|---|
| 6,631,937 B2 * | 10/2003 | Miyakawa | F02B 77/13 296/39.1 |
| 8,079,443 B2 * | 12/2011 | Keller | B64C 1/40 181/292 |
| 8,579,073 B2 | 11/2013 | Sheng et al. | |
| 8,770,343 B2 | 7/2014 | Mathur et al. | |
| 8,857,564 B2 | 10/2014 | Ma et al. | |
| 8,960,365 B2 | 2/2015 | Sheng et al. | |
| 9,445,200 B2 | 9/2016 | Kim et al. | |
| 9,514,732 B2 | 12/2016 | Wu et al. | |
| 9,711,129 B2 | 7/2017 | Sheng et al. | |
| 9,900,698 B2 | 2/2018 | Luzzato et al. | |
| 10,032,445 B1 | 7/2018 | Linch et al. | |
| 2009/0189111 A1 * | 7/2009 | Zamani | G10K 11/165 252/62 |
| 2011/0048850 A1 | 3/2011 | Alexander et al. | |
| 2015/0184374 A1 | 7/2015 | Kang et al. | |
| 2017/0251318 A1 | 8/2017 | Gaskell et al. | |
| 2019/0005938 A1 | 1/2019 | Naya et al. | |
| 2019/0035373 A1 | 1/2019 | Chunren et al. | |

FOREIGN PATENT DOCUMENTS

| | | |
|---|---|---|
| CN | 103810991 A | 5/2014 |
| CN | 103996395 A | 8/2014 |
| CN | 104045979 A | 9/2014 |
| CN | 104320741 A | 1/2015 |
| CN | 105304076 A | 2/2016 |
| CN | 109235810 A | 1/2019 |
| EP | 2 595 142 A1 | 5/2013 |
| TW | I579307 B | 4/2017 |
| WO | WO 2007/127890 A2 | 11/2007 |
| WO | WO 2008/021455 A2 | 2/2008 |
| WO | WO 2017/041283 A1 | 3/2017 |
| WO | WO 2017/181341 A1 | 10/2017 |
| WO | WO 2018/047153 A1 | 3/2018 |
| WO | WO 2019/022245 A1 | 1/2019 |

OTHER PUBLICATIONS

Palma et al., "Acoustic Metamateriais in Aeronautics", Appli. Sci., vol. 8, No. 971, Jun. 13, 2018. pp. 1-18.

Sui et al., "A lightweight yet sound-proof honeycomb acoustic metamaterial", Applied Physics Letters, vol. 106, 2015, pp. 171905-1-171905-4, 5 pages.

Wang et al., "Membrane-constrained acoustic metamateriais for low frequency sound insulation", Applied Physics Letters, vol. 108, 2016, pp. 041905-1-041905-5, 6 pages.

Extended European Search Report for European Application No. 20181728.5, dated Nov. 23, 2020.

Taiwanese Office Action and Search Report for Taiwanese Application No. 108144468, dated Nov. 12, 2020.

* cited by examiner

SOUNDPROOF MEMBER

CROSS REFERENCE TO RELATED APPLICATIONS

This application claims priority of Taiwan Patent Application No. 108144468, filed on Dec. 5, 2019, the entirety of which is incorporated by reference herein.

TECHNICAL FIELD

The disclosure relates to a soundproof member.

BACKGROUND

For buildings such as apartments, office buildings, and hotels, insulation from outdoor noise (such as the noise from automobiles, trains, airplanes, ships, and the like), equipment noise, and human voices, which occur inside buildings, is required to keep rooms quiet. Additionally, it is necessary to insulate against wind noise and engine noise to reduce indoor noise, to provide a quiet and comfortable space to passengers in vehicles such as automobiles, trains, airplanes, ships, and the like.

With conventional soundproofing materials, as their mass increases, sound is more effectively shielded. In order to obtain a good soundproofing effect, large and heavy soundproofing materials are required. However, parts and materials utilized in buildings and vehicles must be lightweight, to improve design flexibility and reduce the power consumption of vehicles. As a result, the soundproofing effectiveness of conventional soundproofing materials is restricted by the mass limitation of buildings or vehicles. Furthermore, conventional soundproofing materials have a relatively high soundproofing effect for high-frequency sound waves and a relatively low soundproofing effect for low-frequency sound waves.

Accordingly, a novel soundproofing material is called for to solve the aforementioned problems.

SUMMARY

According to embodiments of the disclosure, the disclosure provides a soundproof member, including: a structural element, wherein the structural member includes at least one through hole passing through the structural element and extending in a first direction, and the first direction is perpendicular to a bottom surface of the structural element; and a first composite film disposed on the bottom surface of the structural element, wherein the first composite film includes at least one first micro cavity, wherein the first micro cavity is disposed in the first composite film and extends in a second direction, and the second direction is parallel to the bottom surface of the structural element and perpendicular to the first direction, wherein the first micro cavity has a maximum length L1 in the first direction, the first micro cavity has a maximum length L2 in the second direction, and L1/L2 is 0.01 to 0.5.

According to embodiments of the disclosure, the disclosure provides a soundproof member, including: a structural element, wherein the structural member includes at least one through hole passing through the structural element; and a first composite film disposed on a bottom surface of the structural element, wherein the first composite film includes a polymer material and an inorganic nanoscale material, wherein the inorganic nanoscale material and the polymer material have a weight ratio of 1:10 to 2:1.

A detailed description is given in the following embodiments with reference to the accompanying drawings.

DETAILED DESCRIPTION

Figure 1:
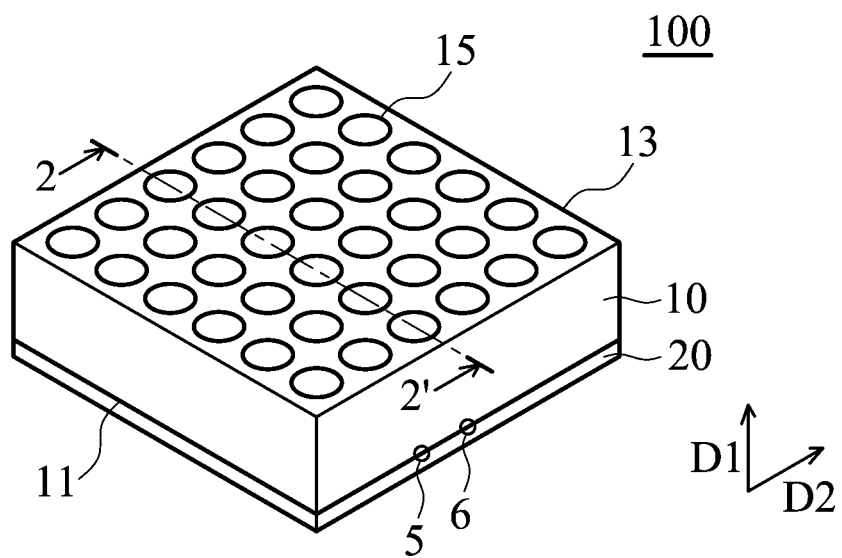
FIG. 1 shows a soundproof member in one embodiment of the disclosure.

The soundproof member of the disclosure is described in detail in the following description. In the following detailed description, for purposes of explanation, numerous specific details and embodiments are set forth in order to provide a thorough understanding of the present disclosure. The specific elements and configurations described in the following detailed description are set forth in order to clearly describe the present disclosure. It will be apparent, however, that the exemplary embodiments set forth herein are used merely for the purpose of illustration, and the inventive concept may be embodied in various forms without being limited to those exemplary embodiments. In the drawings, the size, shape, or thickness of some of the elements may be exaggerated and not drawn on scale for illustrative purposes. The disclosure will be described with respect to particular embodiments and with reference to certain drawings but the disclosure is not limited thereto.

It should be noted that the elements or devices in the drawings of the disclosure may be present in any form or configuration known to those skilled in the art. In addition, the expression "a layer overlying another layer", "a layer is disposed above another layer", "a layer is disposed on another layer" and "a layer is disposed over another layer" may refer to a layer that is in direct contact with the other layer, and they may also refer to a layer that is not in direct contact with the other layer, there being one or more intermediate layers disposed between the layer and the other layer.

Moreover, the use of ordinal terms such as "first", "second", "third", etc., in the disclosure to modify an element does not by itself connote any priority, precedence, or order of one claim element over another or the temporal order in which it is formed, but are used merely as labels to distinguish one claim element having a certain name from another element having the same name (but for use of the ordinal term) to distinguish the claim elements.

Some embodiments of the disclosure provide a soundproof member, which includes a structural element and a first composite film disposed on a bottom surface of the structural element. The first composite film may include a polymer material and an inorganic nanoscale material. Because the inorganic nanoscale material in the first composite film is a one-dimensional inorganic nanoscale material (e.g. nanorod, nanowire, nanoribbon, nanotube, nanofiber, nanotip, or nanopillar) or a two-dimensional inorganic nanoscale material (e.g. nanosheet, nanoplate, or nanodisk), which may construct micro cavities in the first composite film, and the first composite film is therefore anisotropic. Because the micro cavities in the composite film have an effect of increasing the soundwave path, and the through holes of the structural element are sealed by the composite film to form resonant cavity, such that the sound transmission loss (STL) of the soundproof member of the disclosure for low frequency or high frequency sound waves is increased to improve the soundproofing effect. In addition, the properties (e.g. Young's modulus or Poisson's ratio) of the first composite film can be greatly improved by adding the inorganic nanoscale material (compared to the first composite film without adding the inorganic nanoscale material).

According to embodiments, the soundproof member of the disclosure is a metamaterial that simultaneously includes properties of strong, lightweight, and good soundproof. According to embodiments of the disclosure, the soundproof member can be applied in vehicles (such as automobiles, trains, airplanes, or ships) or the related equipment to provide comfortable room for passengers. According to embodiments of the disclosure, the soundproof member of the disclosure can be applied to buildings too, thereby increasing the indoor soundproofing effect or reduce the outdoor environmental noise.

According to embodiments, the disclosure provides a soundproof member. As shown in FIG. 1, the soundproof member 100 includes a structural element 10 with at least one through hole 15 (e.g. a plurality through holes). The through hole 15 extends through the structural element 10 in a first direction D1 (such as passing through the structural element 10 from the bottom surface 11 to the top surface 13). The first direction D1 is perpendicular to the bottom surface 11 or the top surface 13 of the structural element 10. The soundproof member 100 includes a first composite film 20 disposed on the bottom surface 11 of the structural element 10.

Figure 2:
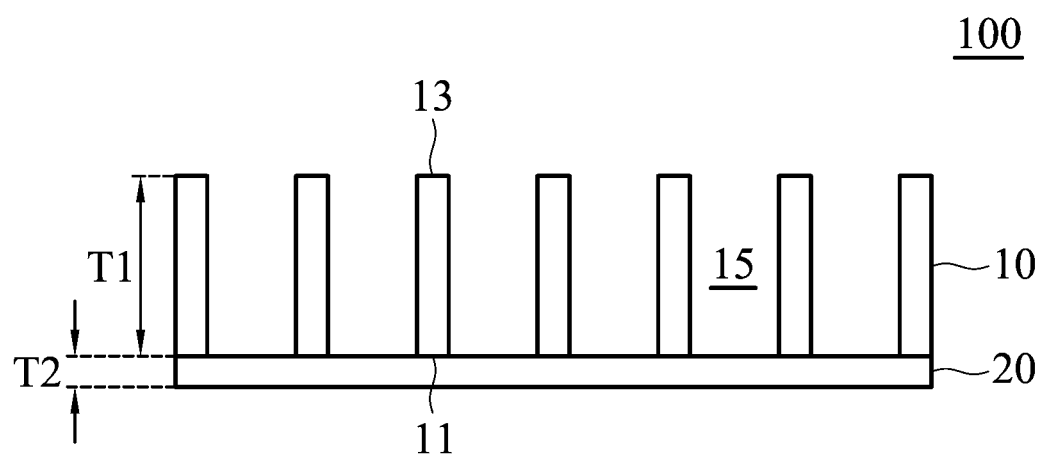
FIG. 2 shows a cross-sectional view of the soundproof member along a cut line 2-2' in FIG. 1.

FIG. 2 shows a cross-sectional view of the soundproof member along a cut line 2-2' in FIG. 1. As shown in FIG. 2, the structural element 10 has a thickness T1 of about 1.5 mm to 20 mm (such as 2 mm to 20 mm, 3 mm to 15 mm, 3 mm to 12 mm, or 2 mm to 10 mm). For example, the structural element 10 may have a thickness T1 of about 1.5 mm, 2 mm, 3 mm, 4 mm, 5 mm, 6 mm, 7 mm, 8 mm, 9 mm, 10 mm, 11 mm, 12 mm, 13 mm, 14 mm, 15 mm, 16 mm, 17 mm, 18 mm, 19 mm, or 20 mm. If the thickness T1 of the structural element 10 is too thin, the depth of the resonant cavity will be insufficient to lower the soundproofing effect of the soundproof member. If the thickness T1 of the structural element 10 is too thick, the total weight of the soundproof member will be increased. As shown in FIG. 2, the first composite film 20 may have a thickness T2 of about 10 μm to 1 mm (such as 10 μm to 500 μm or 10 μm to 300 μm). For example, the first composite film 20 may have a thickness T2 of about 10 μm, 20 μm, 50 μm, 100 μm, 200 μm, 300 μm, 500 μm, or 1 mm. If the thickness T2 of the first composite film 20 is too thin, the first composite film 20 will be easily broken. If the thickness T2 of the first composite film 20 is too thick, the manufacture cost and the weight of the soundproof member will be increased.

According to embodiments of the disclosure, the first composite film 20 is in direct contact with the bottom surface 11 of the structural element 10. In other words, there is no film or medium between the first composite film 20 and the structural element 10. According to embodiments of the disclosure, the first composite film 20 can be combined to the structural element 10 by an adhesive (not shown). According to embodiments of the disclosure, the adhesive can be selected according to the materials of the structural element and the first composite film, as long as the adhesive may combine the first composite film and the structural element, and the material of the adhesive is not particularly limited. For example, the adhesive may include polyvinyl acetate based adhesive, natural polymer based adhesive, vinyl based adhesive, polyester based adhesive, polyamide resin based adhesive, or epoxy resin based adhesive.

Figure 3:
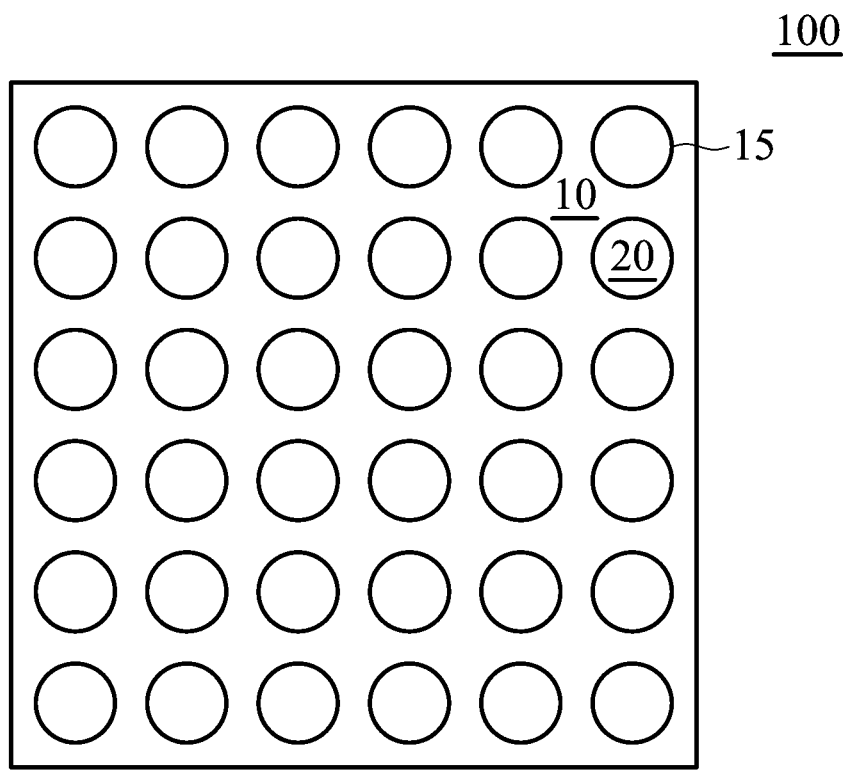
FIG. 3 shows a top view of the soundproof member in FIG. 1.
Figure 4A:
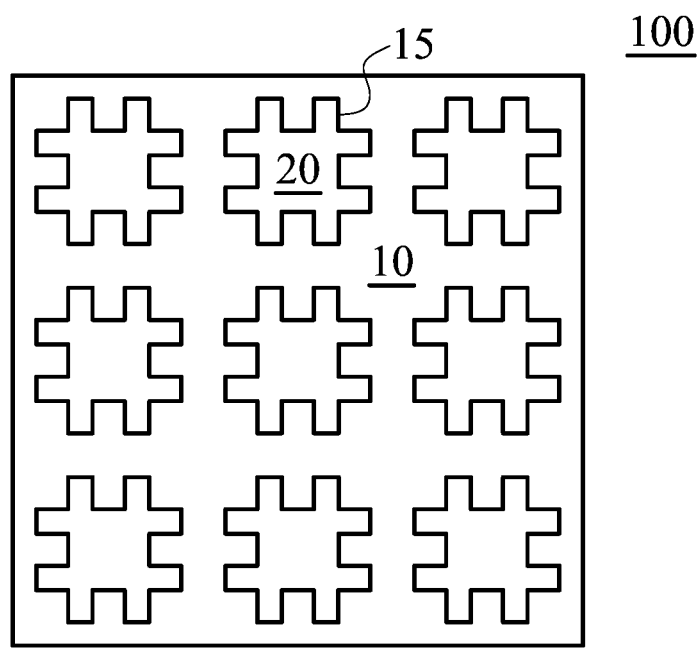
FIGS. 4A to 4E show top views of the soundproof members according to some embodiments of the disclosure.

FIG. 3 shows a top view of the soundproof member 100 in FIG. 1. As shown in FIG. 3, a terminal of the through hole 15 at the bottom surface 11 of the structural element 10 can be sealed by the first composite film 20 according to embodiments of the disclosure. According to embodiments of the disclosure, the horizontal cross section of the structural element 10 is not particularly limited and can be selected as demand in practice, which can be polygon shaped, circle shaped, semi-circle shaped, oval shaped, semi-oval shaped, irregularly shaped, or a combination thereof. In the disclosure, the irregular shaped means an asymmetrical polygon structure or a polygon structure with at least one curved side. The horizontal cross section is parallel to a second direction D2 and perpendicular to the first direction D1. In addition, the second direction D2 is also perpendicular to the first direction D1. According to embodiments of the disclosure, the horizontal cross section of the structural element 10 can be triangle shaped, quadrilateral shaped (as shown in FIGS. 3 and 4A), pentagon shaped, hexagon shaped, heptagon shaped, octagon shaped, dodecagon shaped, polygon shaped (as shown in FIG. 4B), circle shaped (as shown in FIG. 4C), semi-circular shaped, oval shaped, semi-oval shaped, or a combination thereof (as shown in FIG. 4D).

According to embodiments of the disclosure, the horizontal cross section of the through hole 15 is not particularly limited and can be selected as demand in practice, which can be multi-pointed star shaped, polygon shaped, circle shaped, semi-circle shaped, oval shaped, semi-oval shaped, irregularly shaped, or a combination thereof. According to embodiments of the disclosure, the horizontal cross section of the through hole 15 can be three-pointed star shaped, four-pointed star shaped, five-pointed star shaped, six-pointed star shaped (as shown in FIG. 4B), triangle shaped, quadrilateral shaped (as shown in FIGS. 4C and 4D), pentagon shaped, hexagon shaped, heptagon shaped, octagon shaped, dodecagon shaped, polygon shaped (as shown in FIG. 4A), circle shaped (as shown in FIG. 3), semicircular shaped, oval shaped, semi-oval shaped, or a combination thereof.

Figure 4B:
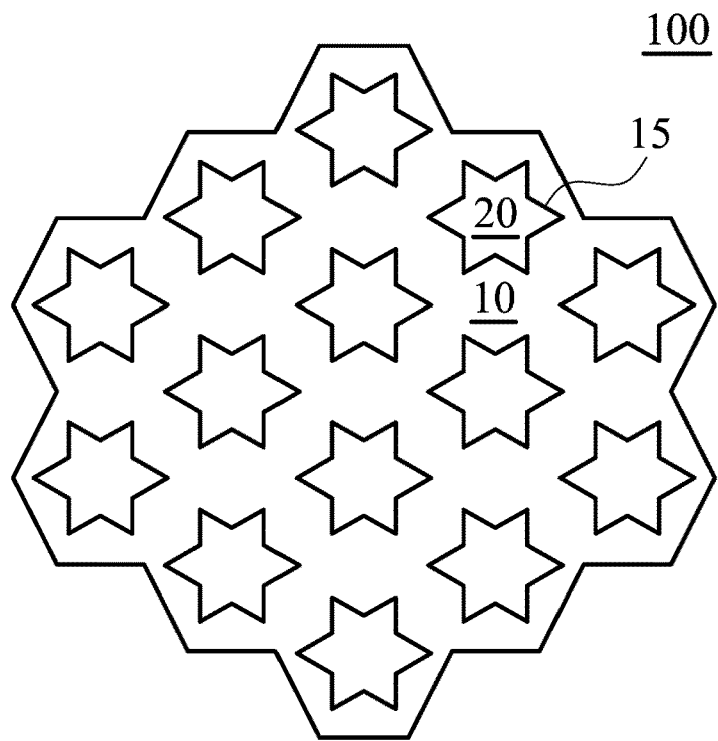
Figure 4C:
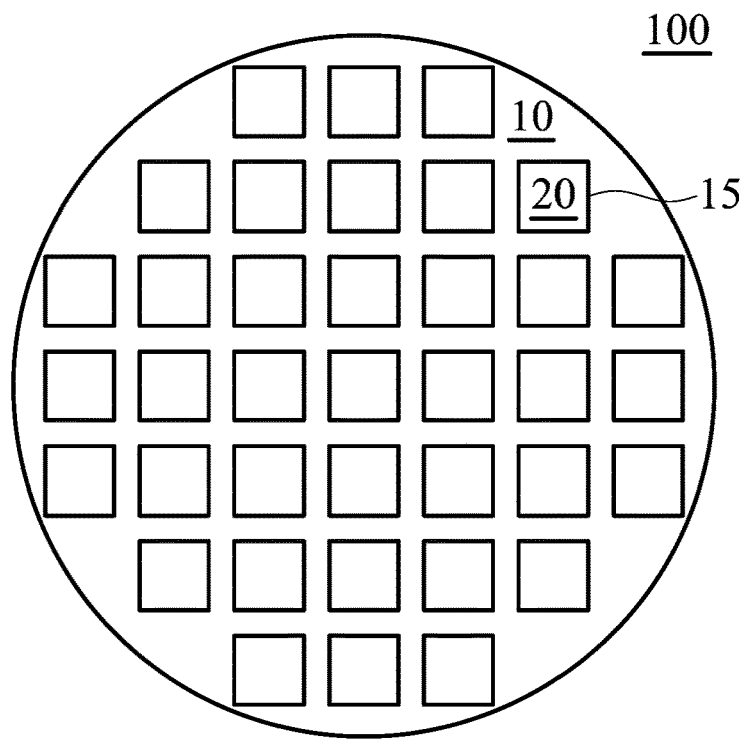
Figure 4D:
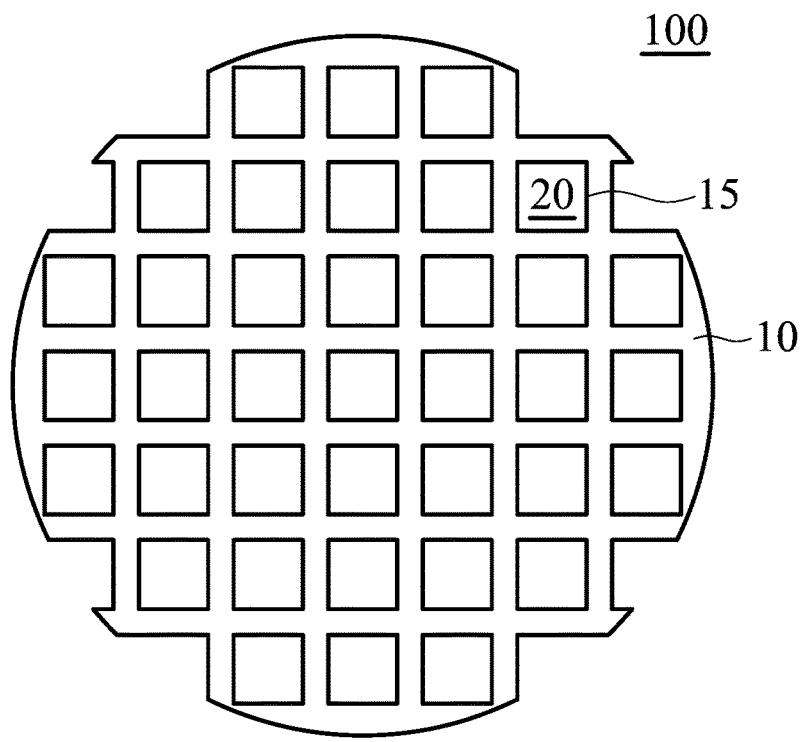
Figure 4E:
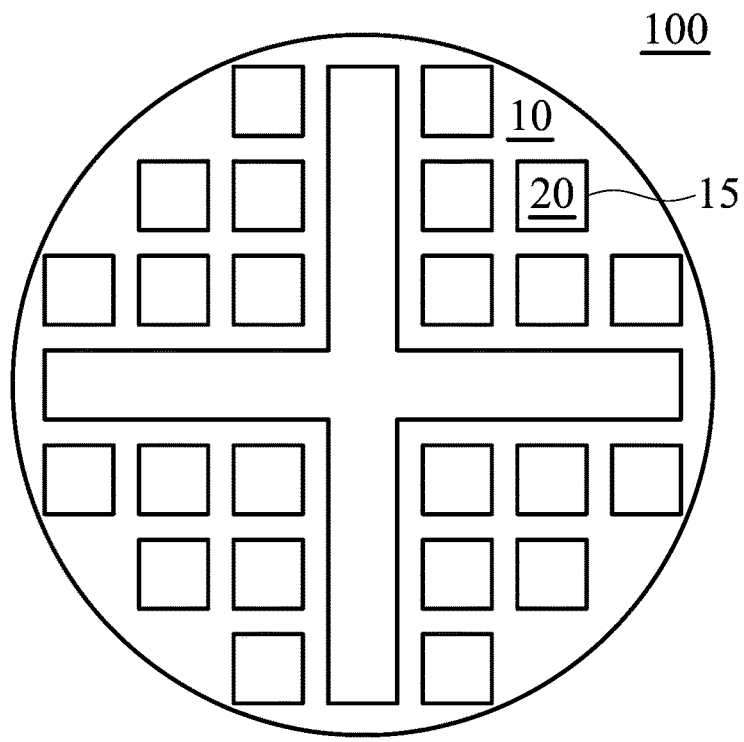

According to embodiments of the disclosure, the through holes are arranged in a random manner, a hive manner (as shown in FIG. 4B), an array manner (as shown in FIGS. 3, 4A, 4C, and 4D), or a periodic manner (as shown in FIG. 4E).

As shown in FIG. 3, the structural element 10 may include a plurality of through holes 15 according to embodiments of the disclosure. The number of through holes per unit area of the structural element can be 0.05 holes/cm$^2$ to 10.0 holes/cm$^2$, such as 0.1 holes/cm$^2$ to 9.0 holes/cm$^2$, 0.2 holes/cm$^2$ to 9.0 holes/cm$^2$, 0.5 holes/cm$^2$ to 8.0 holes/cm$^2$, or 1.0 hole/cm$^2$ to 7.0 holes/cm$^2$. For example, the structural element may have a number of through holes per unit area of 0.1 holes/cm$^2$, 0.3 holes/cm$^2$, 0.6 holes/cm$^2$, 0.8 holes/cm$^2$, 1.5 holes/cm$^2$, 2.0 holes/cm$^2$, 3.0 holes/cm$^2$, 4.0 holes/cm$^2$, 5.0 holes/cm$^2$, or 6.0 holes/cm$^2$. According to embodiments of the disclosure, if the number of through holes per unit area of the structural element is too low, the soundproofing effect of the soundproof member will be lowered.

According to embodiments of the disclosure, the horizontal cross sections of the through holes can be the same or different (as shown in FIG. 4E). According to embodiments of the disclosure, the horizontal cross-sectional areas of the through holes can be the same or different (as shown in FIG. 4E).

According to embodiments of the disclosure, the material of the structural element 10 may include metal, polymer, glass, ceramic, fiber, or a combination thereof. According to embodiments of the disclosure, the material of the structural element may include lithium, sodium, potassium, beryllium, magnesium, calcium, strontium, barium, titanium, chromium, molybdenum, tungsten, manganese, iron, cobalt, iridium, nickel, palladium, platinum, copper, silver, gold, zinc, cadmium, aluminum, gallium, indium, tin, antimony, lead, germanium, or an alloy thereof. According to embodiments of the disclosure, the material of the structural element 10 can be stainless steel. According to embodiments of the disclosure, the material of the structural element may include polyimide, nylon, polyaramide, polybenzimidazole, polyether sulfone (PES), polyethylenimine (PEI), polyacrylonitrile, polyethylene terephthalate (PET), polypropylene, polyaniline, polyethylene oxide, polyethylene naphthalate (PEN), polybutylene terephthalate (PBT), styrene butadiene rubber (SBR), polystyrene, polyvinyl chloride, polyvinyl alcohol (PVA), polyvinylidene fluoride (PVDF), polyvinyl butylene, polycarbonate, or a copolymer thereof. The number average molecular weight of the polymer material is not particularly limited, which can be 5,000 to 1,000,000, such as about 5,000, 10,000, 20,000, 50,000, 100,000, 500,000, 800,000, or 1,000,000. According to embodiments pf the disclosure, the material of the structural element 10 can be a material suitable for 3D printing. According to embodiments, the material of the structural element may include silicon carbide, boron nitride, silicon nitride, mullite, cordierite, zirconia, titania, silica, magnesia, molybdenum oxide, magnesium oxide, ferric oxide, alumina, spinel, kyanite, sillimanite, andalusite, silicate, titanate, clay, talc, zeolite, zircon, silicon dioxide, aluminate, feldspar, tungsten sulfide, molybdenum sulfide, or a combination thereof. According to embodiments of the disclosure, the material of the structural element may include cellulose fiber, protein fiber, or a combination thereof.

Figure 5:
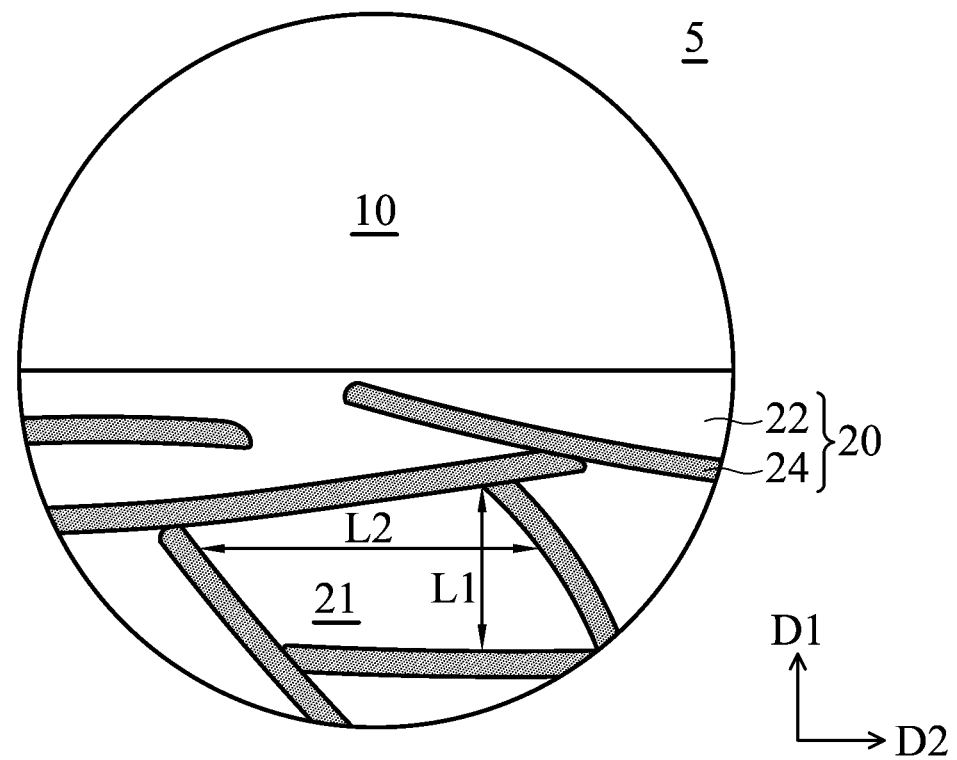
FIG. 5 shows an enlarged view of a region 5 in the soundproof member of FIG. 1.

FIG. 5 shows an enlarged view of a region 5 in the soundproof member 100 of FIG. 1. According to embodiments of the disclosure, the first composite film 20 can be a film composed of a mixture of the polymer material 22 and the inorganic nanoscale material 24, as shown in FIG. 5. According to embodiments of the disclosure, the inorganic nanoscale material 24 may construct at least one first micro cavity 21 in the first composite film due to the inorganic nanoscale material used in the disclosure is a one-dimensional inorganic nanoscale material, a two-dimensional inorganic material, or a combination thereof. The first micro cavity 21 is located in the first composite film 20 and extends in a second direction D2, and the second direction D2 is parallel to the bottom surface 11 of the structural element 10 and perpendicular to the first direction D1. The first micro cavity 21 has a maximum length L1 in the first direction D1 and a maximum length L2 in the second direction D2. Note that the maximum length L1 and the maximum length L2 of the first micro cavity 21 should have a ratio (L1/L2) of less than or equal to 0.5. For example, the maximum length L1 and the maximum length L2 of the first micro cavity 21 have a ratio (L1/L2) of 0.01 to 0.5, such as 0.01, 0.02, 0.05, 0.08, 0.1, 0.2, 0.3, 0.4, or 0.5. In other words, if the micro cavities in the first composite film 20 has a maximum length in the first direction D1, a maximum length in the second direction D2, and a length ratio therebetween of less than or equal to 0.5 (such as 0.01 to 0.5), the micro cavities will be defined as the first micro cavity 21. According to embodiments, the inorganic nanoscale material used in the disclosure may include a one-dimensional inorganic nanoscale material, a two-dimensional inorganic nanoscale material, or a combination thereof.

According to embodiments, the total volume V1 of all the first micro cavities 21 in the first composite film 20 and the volume V of the first composite film 20 have a ratio (V1N) of greater than or equal to 0.03 for elongating the soundwave path by the first composite film 20 to improve the soundproofing effect of the soundproof member 100. In addition, the total volume V1 of all the first micro cavities 21 in the first composite film 20 and the volume V of the first composite film 20 have a ratio (V1/V) of less than or equal to 0.6. According to embodiments of the disclosure, the ratio V1N can be 0.03 to 0.6. According to some embodiments, the ratio V1N can be 0.06 to 0.55. According to embodiments of the disclosure, the ratio V1/V can be 0.03, 0.05, 0.1, 0.15, 0.2, 0.25, 0.3, 0.35, 0.4, 0.45, 0.5, or 0.55. According to embodiments of the disclosure, the V1/V ratio of the first composite film 20 can be obtained by the following steps: The first composite film is firstly analyzed by scanning electron microscope (SEM) to determine the first micro cavities 21 in the SEM image, the volume V1 that is occupied by the first micro cavities 21 and the volume V of the first composite film are counted and calculated to obtain the ratio V1N, the above steps are repeated to obtain ratios V1N of other parts in the first composite film, and the ratios V1N of different parts are averaged.

Figure 6:
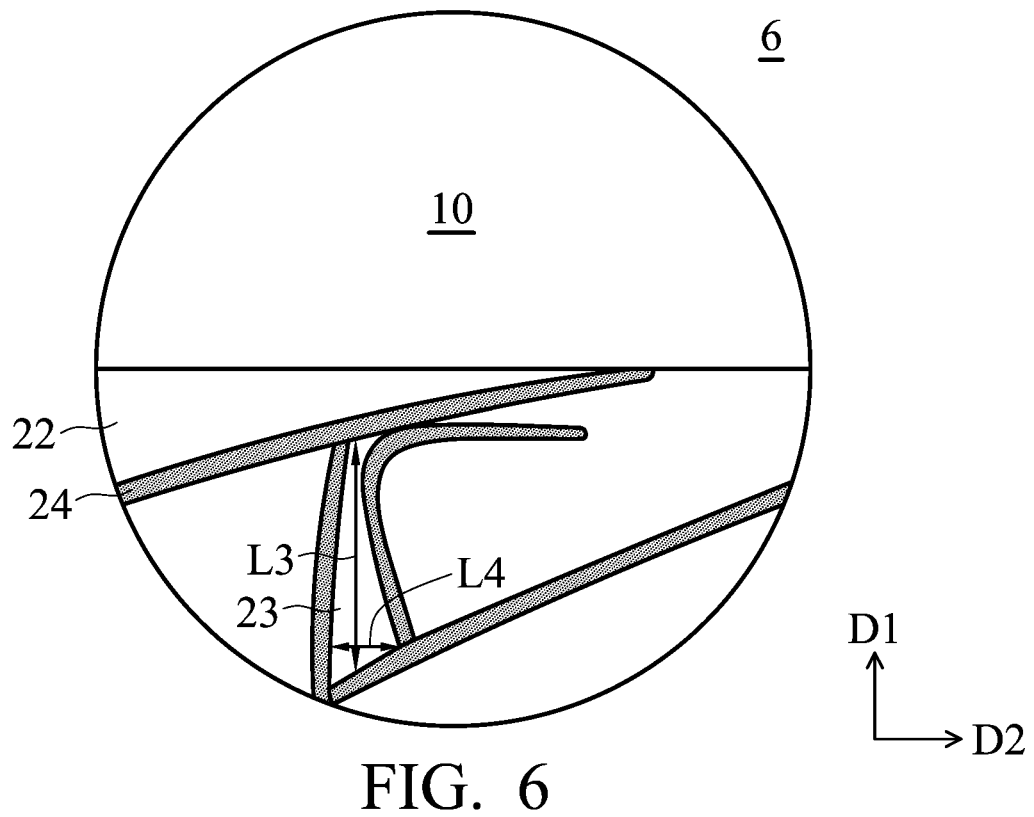
FIG. 6 shows an enlarged view of a region 6 in the soundproof member of FIG. 1.

According to some embodiments of the disclosure, the first composite film 20 may further includes at least one second micro cavity 23, as shown in FIG. 6. The second micro cavity 23 has a maximum length L3 in the first direction D1 and a maximum length L4 in the second direction D4. Note that the maximum length L3 and the maximum length L4 of the second micro cavity 23 have a ratio (L3/L4) of greater than 0.5. For example, the maximum length L3 and the maximum length L4 of the second micro cavity 23 have a ratio (L3/L4) of 0.5 to 100. In other words, if the micro cavity in the first composite film 20 has a maximum length in the first direction D1, a maximum length in the second direction D2, and a length ratio therebetween of greater than 0.5, the micro cavity will be defined as the second micro cavity 23. The total volume V2 of all the second micro cavities 23 in the first composite film 20 and the volume V of the first composite film 20 have a ratio (V2/V) of less than 0.05 for elongating the soundwave path by the first composite film 20 to improve the soundproofing effect of the soundproof member 100. According to embodiments of the disclosure, the ratio V2/V can be 0 to 0.05, 0 to 0.03, or 0 to 0.01. According to embodiments of the disclosure, the ratio V1/V can be larger than the ratio V2/V in the first composite film. According to embodiments of the disclosure, the number and volume of the first micro cavities 21 and the second micro cavities 23 in the first composite film 20 can be controlled by the addition amount and the size of the inorganic nanoscale material 24. For example, when the used inorganic nanoscale material 24 is a one-dimensional inorganic nanoscale material, the first micro cavities 21 are easier to be formed (equal to the second micro cavities 23 are more difficult to be formed) by the one-dimensional inorganic nanoscale material of a longer shape (or of a specific addition amount range). For example, when the used inorganic nanoscale material 24 is a two-dimensional inorganic nanoscale material, the first micro cavities 21 are easier to be formed (equal to the second micro cavities 23 are more difficult to be formed) by the two-dimensional inorganic nanoscale material of a more planar shape (or of a specific addition amount range). According to embodiments of the disclosure, the V2/V ratio of the first composite film 20 can be obtained by the following steps: The first composite film is firstly analyzed by scanning electron microscope (SEM) to determine the second micro cavities 23 in the SEM image, the volume V2 that is occupied by the second micro cavities 23 and the volume V of the first composite film are counted and calculated to obtain the ratio V2/V, the above steps are repeated to obtain ratios V2/V of other parts in the first composite film, and the ratios V2/V of different parts are averaged.

According to embodiments of the disclosure, the first composite film 20 may have a porosity of 1% to 60%, such as 1%, 3%, 5%, 6%, 10%, 15%, 20%, 25%, 30%, 35%, 40%, 45%, 50%, 55%, or 60%. According to some embodiments of the disclosure, the porosity can be 5% to 55%, 10% to 50%, or 10% to 40%. In the disclosure, the porosity means the volume percentage of the first composite film 20 occupied by all types of the micro cavities (including the first micro cavities 21 and the second micro cavities 23). If the porosity of the first composite film 20 is too low, the first composite film 20 will have lower effect of elongating the sound wave path, and fail to increase the soundproofing effect of the soundproof member 100. If the porosity of the first composite film 20 is too high, the mechanical strength of the first composite film 20 will be insufficient.

The organic nanoscale material 24 of the disclosure means that the inorganic material having three dimensions (length, width, and height) may have at least one dimension of less than 100 nm (e.g. 1 nm to 100 nm). The "one-dimensional inorganic nanoscale material" of the disclosure means that the inorganic material has a first dimension, a second dimension, and a third dimension, in which, the first dimension and the second dimension have a size ratio of 5:1 to 1000:1, the first dimension and the third dimension have a size ratio of 5:1 to 1000:1, and the second dimension and the third dimension have a size ratio of 2:1 to 1:1. The "two-dimensional inorganic nanoscale material" of the disclosure means that the inorganic material has a first dimension, a second dimension, and a third dimension, in which, the first dimension and the second dimension have a size ratio of 4:1 to 1:1, the first dimension and the third dimension have a size ratio of 5:1 to 1000:1, and the second dimension and the third dimension have a size ratio of 5:1 to 1000:1.

According to embodiments of the disclosure, the number of first micro cavities in the composite film can be increased (and the number of second micro cavities in the composite film can be decreased) by adding the inorganic nanoscale material of the disclosure into the composite film, thereby improving the soundproofing effect of the soundproof member 100.

According to embodiments, the inorganic nanoscale material 24 may include graphene, graphene oxide, carbon nanotube, halloysite nanotube (HNT), nanoclay, carbon nanofiber, silver nanowire, or a combination thereof.

According to embodiments of the disclosure, the one-dimensional inorganic nanoscale material may include nanorod, nanowire, nanoribbon, nanotube (e.g. single walled nanotube, double-walled nanotube, multi-walled nanotube, or roped nanotube), nanofiber, nanotip, nanopillar, or a combination thereof.

According to embodiments of the disclosure, the one-dimensional inorganic nanoscale material may include metal material, ceramic material, carbon-based material, or a combination thereof.

According to embodiments of the disclosure, the one-dimensional inorganic nanoscale material may include carbon nanotube, halloysite nanotube, carbon nanofiber, silver nanowire, gold nanowire, nickel nanowire, copper nanowire, zinc oxide nanowire, titanium oxide nanowire, or a combination thereof.

According to embodiments of the disclosure, the two-dimensional inorganic nanoscale material may include nanosheet, nanoplate, nanodisk, or a combination thereof.

According to embodiments of the disclosure, the two-dimensional inorganic nanoscale material may include metal material, ceramic material, carbon-based material, transition metal dichalcogenide, clay, or a combination thereof.

According to embodiments of the disclosure, the two-dimensional inorganic nanoscale material may include graphene flake, graphene oxide flake, graphene-like flake, scrolled graphene, scrolled graphene oxide, nanoclay flake, or a combination thereof.

According to embodiments of the disclosure, the polymer material 22 may include polyimide, nylon, polyaramide, polybenzimidazole, polyether sulfone (PES), polyetherimide (PEI), polyacrylonitrile, polyethylene terephthalate (PET), polypropylene, polyethylenimine (PEI), poly aniline, polyethylene oxide, polyethylene naphthalate (PEN), polybutylene terephthalate (PBT), styrene butadiene rubber (SBR), polystyrene, polyvinyl chloride, polyvinyl alcohol (PVA), polyvinylidene fluoride (PVDF), polyvinyl butylene, polycarbonate, or a copolymer thereof.

According to embodiments of the disclosure, the polymer material 22 may have a number average molecular weight (that is not particularly limited) of 5,000 to 1,000,000, such as about 5,000, 10,000, 20,000, 50,000, 100,000, 500,000, 800,000, or 1,000,000.

According to embodiments of the disclosure, the inorganic nanoscale material 24 and the polymer material 22 in the first composite film 20 may have a weight ratio of 1:10 to 2:1, such as 1:10, 1:8, 1:5, 1:3, 1:2, 1:1, or 2:1. According the embodiments of the disclosure, if the weight ratio of inorganic nanoscale material to polymer material is too low, the soundproofing effect of the soundproof member will be lowered.

According to embodiments of the disclosure, when the first composite film 20 is a film composed of a mixture of the polymer material 22 and the inorganic nanoscale material 24, the inorganic nanoscale material 24 and the polymer material 22 may have a weight ratio of 1:10 to 1:1 (such as 1:10, 1:8, 1:5, 1:3, 1:2, or 1:1). If the weight ratio of inorganic nanoscale material to polymer material is too low, the soundproofing effectiveness of the soundproof member will be lowered. If the weight ratio of inorganic nanoscale material to polymer material is too high, the first composite film 20 will be brittle. According to embodiments, the inorganic nanoscale material 24 and the polymer material 22 may have a weight ratio of 1:5 to 1:2, such as 1:5, 1:4, 1:3, or 1:2.

Figure 7:
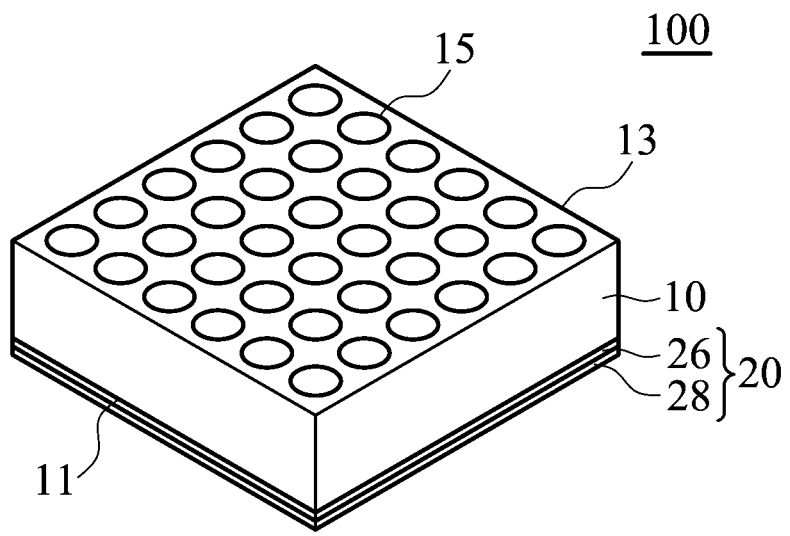
FIG. 7 shows a soundproof member according to some embodiments of the disclosure.

FIG. 7 shows a soundproof member 100 according to some embodiments of the disclosure. As shown in FIG. 7, the first composite film 20 of the soundproof member 100 can be a lamination, in which the lamination includes a first layer 26 and a second layer 28. According to embodiments of the disclosure, the first layer 26 includes the inorganic nanoscale material, and the second layer 28 includes the polymer material.

According to embodiments of the disclosure, the first layer 26 can be disposed between the second layer 28 and the structural element 10, in which the first composite film 20 is disposed on the bottom surface 11 of the structural element 10 by the first layer 26, as shown in FIG. 7. In addition, the second layer 28 can be disposed between the first layer 26 and the structural element 10 according to other embodiments of the disclosure, in which the first composite film 20 is disposed on the bottom surface 11 of the structural element 10 by the second layer 28. According to embodiments of the disclosure, the first layer 26 and the second layer 28 may have a thickness ratio of about 1:10 to 10:1, such as 1:8 to 8:1, 1:5 to 5:1, or 1:3 to 3:1. According to embodiments of the disclosure, the first layer 26 can be mainly composed of the inorganic nanoscale material, and the second layer 28 can be composed of the polymer material. According to embodiments of the disclosure, the first layer 26 may include an inorganic nanoscale material and a polymer additive. According to embodiments of the disclosure, the polymer additive has a weight percentage of 0.1 wt % to 10 wt % on the basis of the weight of the first layer 26. According to embodiments of the disclosure, the polymer additive may include polyimide, nylon, polyaramide, polybenzimidazole, polyether sulfone (PES), polyetherimide (PEI), polyacrylonitrile, polyethylene terephthalate (PET), polypropylene, polyethylenimine (PEI), poly aniline, polyethylene oxide, polyethylene naphthalate (PEN), polybutylene terephthalate (PBT), styrene butadiene rubber (SBR), polystyrene, polyvinyl chloride, polyvinyl alcohol (PVA), polyvinylidene fluoride (PVDF), polyvinyl butylene, polycarbonate, or a copolymer thereof.

According to embodiments of the disclosure, the second layer 28 composed of the polymer material may have micro cavities or a foam structure. According to some embodiments of the disclosure, the first composite film 20 of the soundproof member 100 can be constructed by the first layer 26 and the second layer 28.

Figure 8:
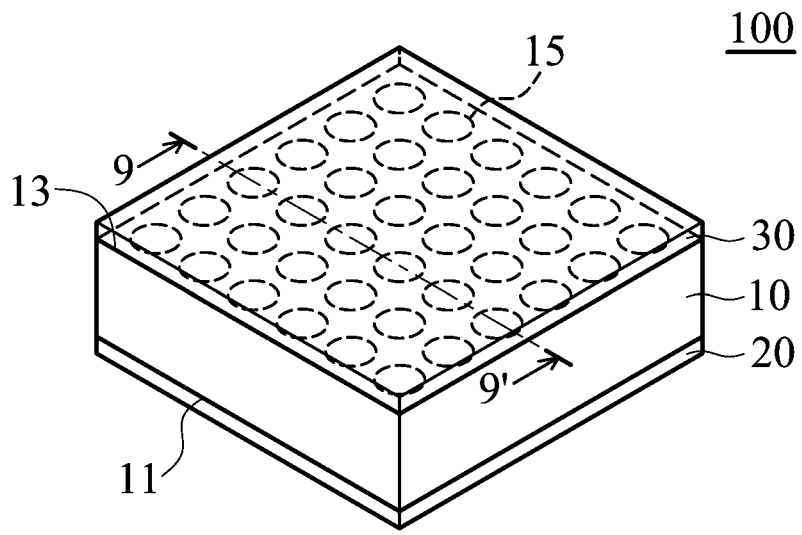
FIG. 8 shows a soundproof member according to some embodiments of the disclosure.

FIG. 8 shows a perspective view of the soundproof member 100 according to some embodiments of the disclosure. As shown in FIG. 8, the soundproof 100 includes not only the first composite film 20 but also a second composite film 30 disposed on the top surface 13 of the structural element 10. The second composite film 30 includes a polymer material and an inorganic nanoscale material, and the definitions of the polymer material and the inorganic nanoscale material are the same as above. In addition, the definition of the second composite film 30 is the same as that of the first composite film 20.

According to embodiments of the disclosure, the second composite film 30 and the first composite film 20 may be made of the same material. According to embodiments of the disclosure, the second composite film 30 and the first composite film 20 may be the same size. According to embodiments of the disclosure, the second composite film 30 and the first composite film 20 can be same, which are prepared using the same steps and the same materials. In addition, the material or size of the second composite film 30 can be different from those of the first composite film 20 according to embodiments of the disclosure.

According to embodiments of the disclosure, the second composite film 30 is in direct contact with the top surface 13 of the structural element 10. In other words, there is no film or medium between the second composite film 30 and the structural element 10. According to embodiments of the disclosure, the second composite film 30 can be combined to the structural element 10 by an adhesive (not shown). According to embodiments of the disclosure, the adhesive can be selected according to the materials of the structural element and the second composite film, as long as the adhesive may combine the second composite film and the structural element, and the material of the adhesive is not particularly limited. For example, the adhesive may include polyvinyl acetate based adhesive, natural polymer based adhesive, vinyl based adhesive, polyester based adhesive, polyamide resin based adhesive, or epoxy resin based adhesive.

Figure 9:
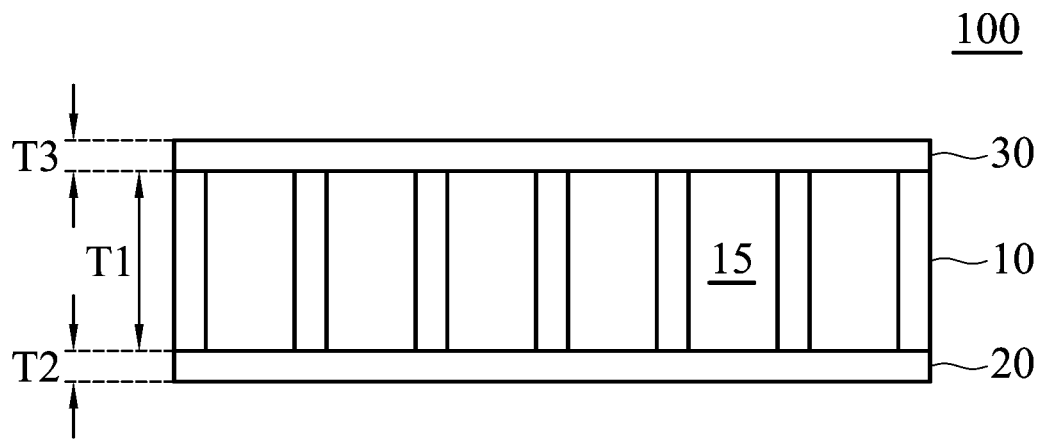
FIG. 9 shows a cross-sectional view of the soundproof member along a cut line 9-9' in FIG. 8.

FIG. 9 shows a cross-sectional view of the soundproof member 100 along a cut line 9-9' in FIG. 8. As shown in FIG. 9, the second composite film 30 has a thickness T3 of about 10 µm to 1 mm (such as 10 µm to 500 µm, or 10 µm to 300 µm). For example, the second composite film 30 may have the thickness T3 of about 10 µm, 20 µm, 50 µm, 100 µm, 200 µm, 300 µm, 500 µm, or 1 mm. According to embodiments of the disclosure, the thickness T3 of the second composite film 30 and the thickness T2 of the first composite film 20 can be same. Alternatively, the thickness T3 of the second composite film 30 and the thickness T2 of the first composite film 20 can be different.

As shown in FIG. 8, a terminal of the through holes 15 at the top surface 13 of the structural element 10 can be sealed by the second composite film 30 according to embodiments of the disclosure.

According to embodiments of the disclosure, the second composite film 30 can be a film composed of a mixture of the polymer material and the inorganic nanoscale material. According to embodiments of the disclosure, the inorganic nanoscale material may construct micro cavities in the second composite film 30 due to the inorganic nanoscale material is a one-dimensional inorganic nanoscale material, a two-dimensional inorganic nanoscale material, or a combination thereof.

According to embodiments of the disclosure, the second composite film 30 may include the first micro cavities 21 (as defined above), and the total volume V1 of the first micro cavities 21 in the second composite film 30 and the volume V of the second composite film 30 have a ratio (V1/V) of 0.03 to 0.6. According to embodiments of the disclosure, the second composite film 30 may include the second micro cavities 23 (as defined above), and the total volume V2 of the second micro cavities 23 in the second composite film 30 and the volume V of the second composite film 30 have a ratio (V2/V) of less than 0.05. According to embodiments of the disclosure, the second composite film 30 may have a porosity of 10% to 40%, such as 10%, 15%, 20%, 25%, 30%, 35%, or 40%. In this disclosure, the porosity means the volume percentage of the second composite film 30 that is occupied by all types of the micro cavities (including the first micro cavities 21 and the second micro cavities 23).

Figure 10:
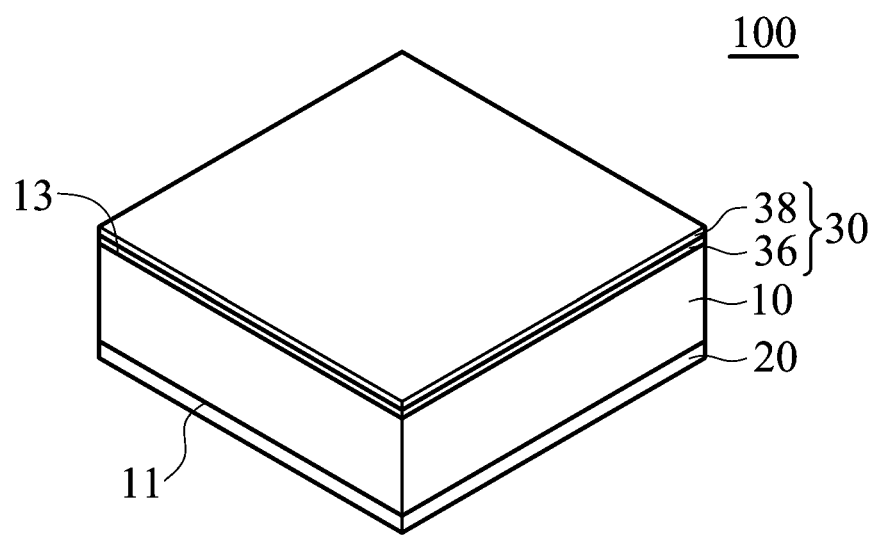
FIG. 10 shows a soundproof member according to some embodiments of the disclosure.

FIG. 10 shows a soundproof member 100 according to some embodiments of the disclosure. As shown in FIG. 10, the second composite film 30 of the soundproof member 100 according to embodiments of the disclosure can be a lamination containing a third layer 36 and a fourth layer 38. According to embodiments of the disclosure, the third layer 36 includes the inorganic nanoscale material, and the fourth layer 38 includes the polymer material. The third layer 36 can be disposed between the fourth layer 38 and the structural element 10, in which the second composite film 30 is disposed on the top surface 13 of the structural element 10 by the third layer 36, as shown in FIG. 10. In addition, the fourth layer 38 can be disposed between the third layer 36 and the structural element 10, in which the second composite film 30 is disposed on the top surface 13 of the structural element 10 by the fourth layer 38 in other embodiments of the disclosure. According to embodiments of the disclosure, the third layer 36 and the fourth layer 38 may have a thickness ratio of about 1:10 to 10:1, such as 1:8 to 8:1, 1:5 to 5:1, or 1:3 to 3:1. According to some embodiments of the disclosure, the second composite film 30 of the soundproof member 100 can be constructed by the third layer 36 and the fourth layer 38. According to embodiments of the disclosure, the first composite film and the second composite film can be simultaneously a film composed of a mixture of the polymer material and the inorganic nanoscale material. In addition, the first composite film and the second composite film can be simultaneously a lamination constructed by the polymer material and the inorganic nanoscale material according to embodiments of the disclosure. Next, the first composite film or the second composite film can be a film composed of a mixture of the polymer material and the inorganic nanoscale material, and the other can be a lamination of the polymer material and the inorganic nanoscale material according to embodiments of the disclosure.

Below, exemplary embodiments will be described in detail with reference to the accompanying drawings so as to be easily realized by a person having ordinary knowledge in the art. The inventive concept may be embodied in various forms without being limited to the exemplary embodiments set forth herein. Descriptions of well-known parts are omitted for clarity, and like reference numerals refer to like elements throughout.

EXAMPLES

Preparation of Composite Film

Preparation Example 1

Figure 11:
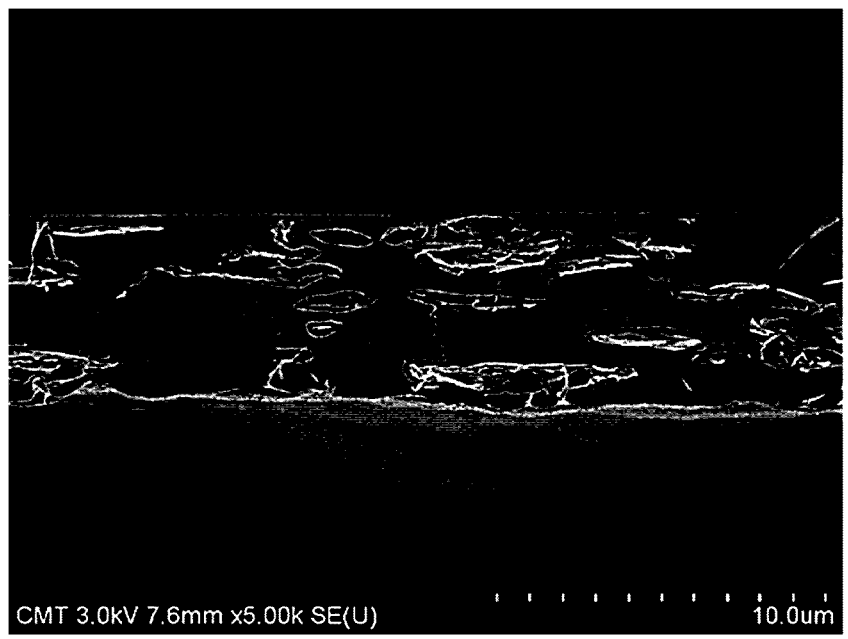
FIG. 11 shows a scanning electron microscopic (SEM) image of a composite film (1) in Preparation Example 1.

100 parts by weight of polyvinylidene difluoride (PVDF having a number average molecular weight (Mn) of about 180000, commercially available from Aldrich), 25 parts by weight of graphene flake having an average size of 0.6 μm×1.3 μm, and 50 parts by weight of solvent (containing dimethylformamide (DMF) and N-methyl-2-pyrrolidone (NMP) in a ratio of 1:1) were mixed to obtain a composition. Subsequently, the composition was poured into a mold, and baked to remove the solvent for obtaining a composite film (1) with a thickness of about 50 μm. The composite film (1) was analyzed by SEM to calculate its porosity (3.2%). The SEM image of the composite film (1) is shown in FIG. 11.

Preparation Example 2

Figure 12:
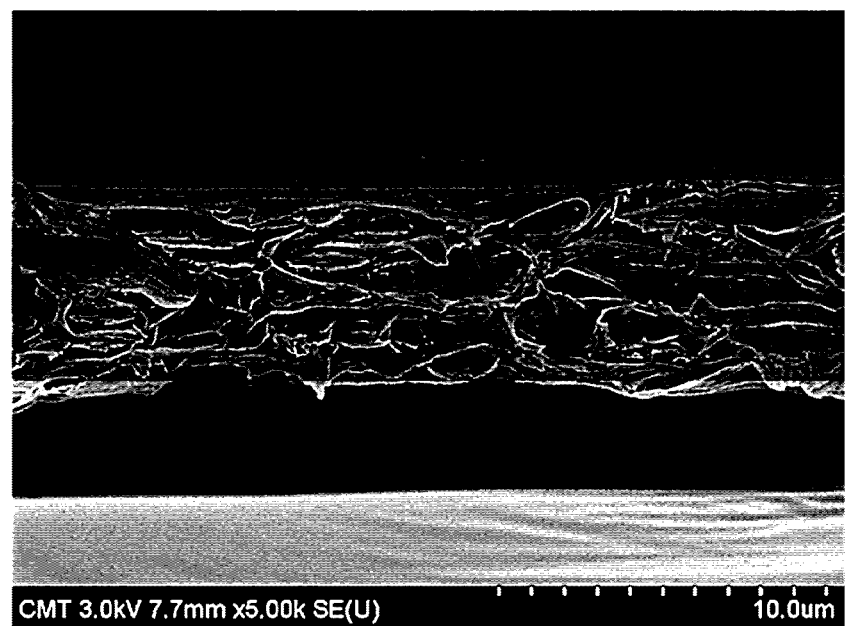
FIG. 12 shows a SEM image of a composite film (2) in Preparation Example 2.

Preparation Example 2 was similar to Preparation Example 1, and the difference in Preparation Example 2 was the amount of graphene flakes being increased from 25 parts by weight to 50 parts by weight to obtain a composite film (2) with a thickness of about 50 μm. The composite film (2) was analyzed by SEM to calculate its porosity (26.3%). The SEM image of the composite film (2) is shown in FIG. 12.

Preparation Example 3

Figure 13:
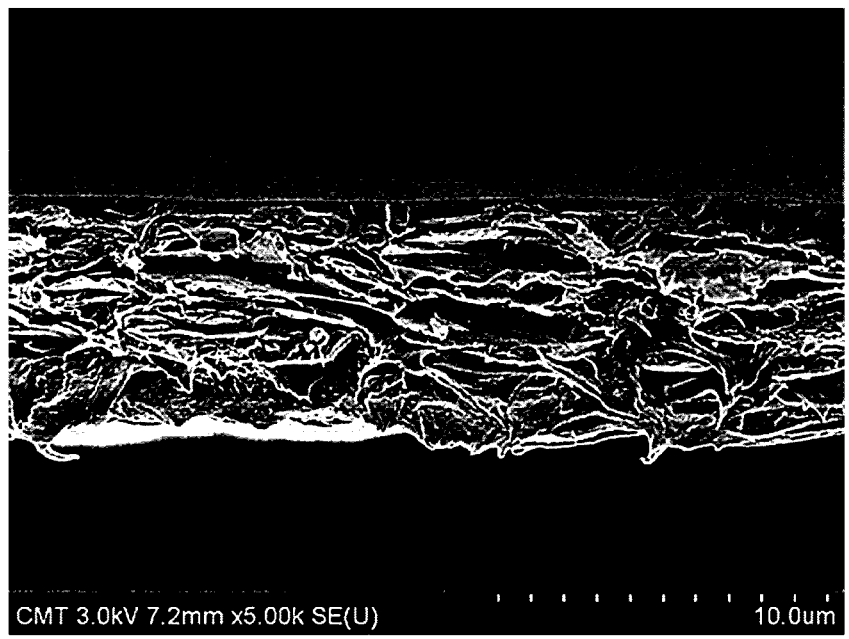
FIG. 13 shows a SEM image of a composite film (3) in Preparation Example 3.

Preparation Example 3 was similar to Preparation Example 1, and the difference in Preparation Example 3 was the amount of graphene flakes being increased from 25 parts by weight to 75 parts by weight to obtain a composite film (3) with a thickness of about 50 μm. The composite film (3) was analyzed by SEM to calculate its porosity (52.2%). The SEM image of the composite film (3) is shown in FIG. 13.

Preparation Example 4

Figure 14:
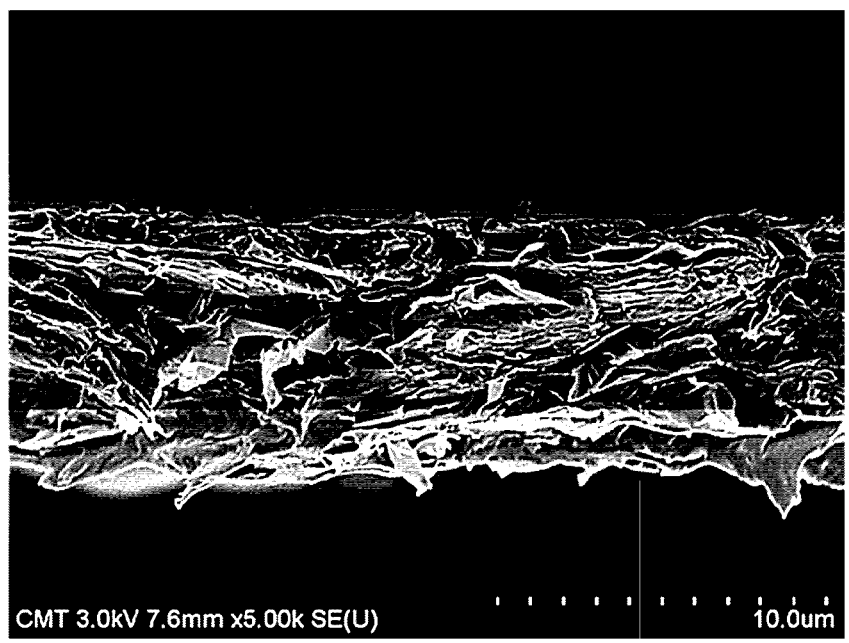
FIG. 14 shows a SEM image of a composite film (4) in Preparation Example 4.

Preparation Example 4 was similar to Preparation Example 1, and the difference in Preparation Example 4 was the amount of graphene flakes being increased from 25 parts by weight to 100 parts by weight to obtain a composite film (4) with a thickness of about 50 μm. The composite film (4) was analyzed by SEM to calculate its porosity (45.1%). The SEM image of the composite film (4) is shown in FIG. 14.

As shown in FIGS. 11 to 14, when the amount of graphene flakes was gradually increased from 25 parts by weight to 75 parts by weight, the number of first micro cavities in the composite films was proportional to the graphene flake amount. In addition, when the graphene amount was increased from 75 parts by weight to 100 parts by weight, the number of first micro cavities in the composite film decreased.

Preparation Example 5

Figure 15:
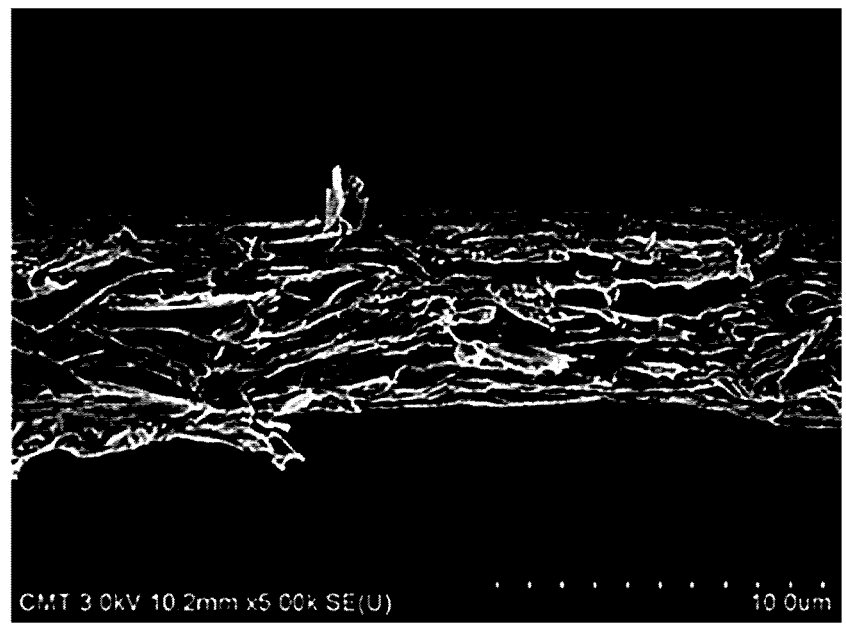
FIG. 15 shows a SEM image of a composite film (5) in Preparation Example 5.

100 parts by weight of polyvinyl alcohol (PVA having Mn of about 80000, commercially available from First Chemical Group), 40 parts by weight of graphene oxide (GO) flake having an average size of 0.3 μm×0.6 μm, and 110 parts by weight of deionized water were mixed to obtain a composition. Subsequently, the composition was poured into a mold, and baked to remove the solvent for obtaining a composite film (5) with a thickness of about 50 μm. The composite film (5) was analyzed by SEM to calculate its porosity (38.7%). The SEM image of the composite film (5) is shown in FIG. 15.

Preparation Example 6

Figure 16:
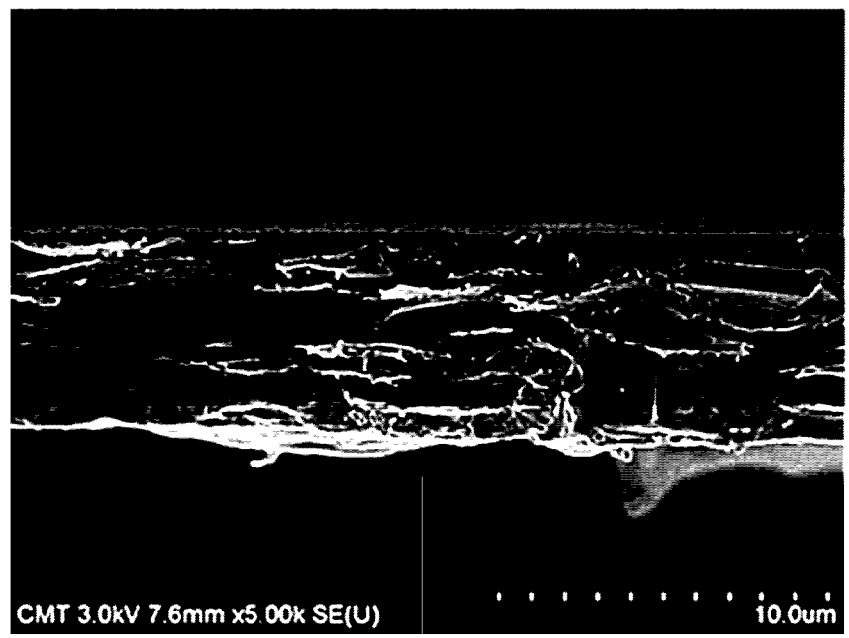
FIG. 16 shows a SEM image of a composite film (6) in Preparation Example 6.

Preparation Example 6 was similar to Preparation Example 5, and the difference in Preparation Example 6 was the amount of graphene flakes being decreased from 40 parts by weight to 20 parts by weight to obtain a composite film (6) with a thickness of about 50 μm. The composite film (6) was analyzed by SEM to calculate its porosity (6.5%). The SEM image of the composite film (6) is shown in FIG. 16.

Preparation Example 7

100 parts by weight of polyvinyl alcohol (PVA having Mn of about 80000, commercially available from First Chemical Group), 40 parts by weight of graphene oxide (GO) flake having an average size of 0.3 μm×0.6 μm, 5 parts by weigh of halloysite nanotube (HNT) having an average length of about 2 μm and a diameter of about 0.05 μm (commercially available from Aldrich), and 110 parts by weight of deionized water were mixed to obtain a composition. Subsequently, the composition was poured into a mold, and baked to remove the solvent for obtaining a composite film (7) with a thickness of about 50 μm.

Preparation Example 8

100 parts by weight of graphene oxide (GO) flake, 0.5 parts by weight of polyvinyl alcohol (PVA having Mn of about 80000, commercially available from First Chemical Group), and 10 parts by weight of deionized water were mixed to obtain a composition. Subsequently, a polymer layer having a thickness of about 100 μm (nylon, commercially available from Finetech Research & Innovation Corp.) was disposed in a mold. Subsequently, the composition was poured into the mold, and baked to remove the solvent for forming a graphene oxide layer with a thickness of about 5 μm on the polymer layer, thereby obtaining a composite film (8) with a thickness of about 100 μm. The composite film (8) was constructed of the graphene oxide layer and the polymer layer.

Preparation Example 9

100 parts by weight of polyvinyl alcohol (PVA having Mn of about 80000, commercially available from First Chemical Group), 30 parts by weight of nano clay flake (Serial No. 682659, commercially available from Sigma-Aldrich), and 110 parts by weight of deionized water were mixed to obtain a composition. Subsequently, the composition was poured into a mold, and baked to remove the solvent for obtaining a composite film (9) with a thickness of about 50 μm.

Preparation Example 10

100 parts by weight of polyethylenimine (PEI having Mn of about 25000, commercially available from Aldrich), 20 parts by weight of graphene oxide flake having an average size of 0.3 μm×0.6 μm, and 100 mL of deionized water were mixed to obtain a composition. Subsequently, the composition was poured into a mold, and baked to remove the solvent for obtaining a composite film (10) with a thickness of about 50 μm.

Preparation Example 11

Preparation Example 11 was similar to Preparation Example 10, and the difference in Preparation Example 11 was the amount of graphene oxide flakes being increased from 20 parts by weight to 40 parts by weight to obtain a composite film (11) with a thickness of about 50 μm.

Preparation Example 12

100 parts by weight of polyethylenimine (PEI having Mn of about 25000, commercially available from Aldrich), 30 parts by weight of clay flake (Serial No. 682659, commercially available from Sigma-Aldrich), and 100 mL of solvent (deionized water) were mixed to obtain a composition. Subsequently, the composition was poured into a mold, and baked to remove the solvent for obtaining a composite film (12) with a thickness of about 50 μm.

Preparation Example 13

100 parts by weight of polyethylenimine (PEI having Mn of about 25000, commercially available from Aldrich), 10 parts by weight of halloysite nanotube (HNT) having an average length of about 2 μm and a diameter of about 0.05 μm, and 100 mL of solvent (deionized water) were mixed to obtain a composition. Subsequently, the composition was poured into a mold, and baked to remove the solvent for obtaining a composite film (13) with a thickness of about 50 μm.

Soundproof Member

Example 1

A structural element composed of polylactic acid was provided, which had a horizontal cross section of circular shape, a surface area of 23.4 $cm^2$, and a thickness of about 3 mm. The structural element had a plurality of through holes arranged in an array. The through holes had the same horizontal cross-sectional area, and a horizontal cross section of quadrilateral shape. The structural element had a number of through holes per unit area of 4.32 holes/$cm^2$. Subsequently, the composite film (5) from Preparation Example 5 was cut to obtain a circular composite film (5) with a surface area of 23.4 $cm^2$. Subsequently, the cut composite film (5) was disposed on the bottom surface of the structural element to be in direct contact with the bottom surface of the structural element to obtain a soundproof member (1). As such, terminals of all the through holes at the bottom surface of the structural element were sealed.

Subsequently, the sound transmission loss (STL) at different frequencies of the soundproof member (1) was measured according to the standard ASTM E2611-09 (standard test method for measurement of normal incidence sound transmission of acoustical materials based on the transfer matrix method), and the measurement result is shown in Table 1.

Example 2

A structural element composed of polylactic acid was provided, which had a horizontal cross section of circular shape, a surface area of 23.4 $cm^2$, and a thickness of about 3 mm. The structural element had a plurality of through holes arranged in an array. The through holes had the same horizontal cross-sectional area, and a horizontal cross section of quadrilateral shape. The structural element had a number of through holes per unit area of 4.32 holes/$cm^2$. Subsequently, the composite film (5) from Preparation Example 5 was cut to obtain a circular composite film (5) with a surface area of 23.4 $cm^2$. Subsequently, the two cut composite films (5) were respectively disposed on the bottom surface and the top surface of the structural element to be in direct contact with the bottom surface and the top surface of the structural element to obtain a soundproof member (2). As such, terminals of all the through holes at the top surface of the structural element were sealed by the composite film (5) disposed on the top surface of the structural element, and terminals of all the through holes at the bottom surface of the structural element were sealed by the composite film (5) disposed on the bottom surface of the structural element. Subsequently, the sound transmission loss (STL) at different frequencies of the soundproof member (2) was measured according to the standard ASTM E2611-09, and the measurement result is shown in Table 1.

TABLE 1

|  | Composite film content | Structural element thickness | Composite film location | Sound transmission loss at frequency of less than 500 Hz (db) | Sound transmission loss at frequency of 630 Hz to 4000 Hz (db) |
|---|---|---|---|---|---|
| Example 1 | PVA/GO (weight ratio = 100:40) | 3 mm | At the bottom surface of the structural element | 27.7 | 21.3 |
| Example 2 | PVA/GO (weight ratio = 100:40) | 3 mm | At the bottom surface and the top surface of the structural element | 47.9 | 41.1 |

As shown in Table 1, the soundproof member of the disclosure actually had excellent soundproofing effects for sounds at low frequencies and high frequencies. In addition, the soundproof member (2) having composite films at both sides of the structural element had about 1.72 times the soundproofing effect for sound at low frequencies and about 1.92 times the soundproofing effect for sound at high frequencies compared to the soundproof member (1) having only one composite film at one side of the structural element.

Example 3

Example 3 was similar to Example 2, and the difference in Example 3 was the thickness of the structural element being increased from 3 mm to 6 mm to obtain a soundproof member (3). Subsequently, the sound transmission loss (STL) at different frequencies of the soundproof member (3) was measured according to the standard ASTM E2611-09, and the measurement result is shown in Table 2.

Example 4

Example 4 was similar to Example 2, and the difference in Example 4 was the thickness of the structural element being decreased from 3 mm to 2 mm to obtain a soundproof member (4). Subsequently, the sound transmission loss (STL) at different frequencies of the soundproof member (4) was measured according to the standard ASTM E2611-09, and the measurement result is shown in Table 2.

Comparative Example 1

Comparative Example 1 was similar to Example 2, and the difference in Comparative Example 1 was the thickness of the structural element being decreased from 3 mm to 1 mm to obtain a soundproof member (5). Subsequently, the sound transmission loss (STL) at different frequencies of the soundproof member (5) was measured according to the standard ASTM E2611-09, and the measurement result is shown in Table 2.

TABLE 2

|  | Composite film content | Structural element thickness | Composite film location | Sound transmission loss at frequency of less than 500 Hz (db) | Sound transmission loss at frequency of 630 Hz to 4000 Hz (db) |
|---|---|---|---|---|---|
| Example 2 | PVA/GO (weight ratio = 100:40) | 3 mm | At the bottom surface and the top surface of the structural element | 47.9 | 41.1 |
| Example 3 | PVA/GO (weight ratio = 100:40) | 6 mm | At the bottom surface and the top surface of the structural element | 49.9 | 44.9 |
| Example 4 | PVA/GO (weight ratio = 100:40) | 2 mm | At the bottom surface and the top surface of the structural element | 37.1 | 25.6 |
| Comparative Example 1 | PVA/GO (weight ratio = 100:40) | 1 mm | At the bottom surface and the top surface of the structural element | 24.2 | 19.3 |

As shown in Table 2, when the thickness of the structural element was increased from 3 mm to 6 mm (e.g. the length of the through hole was also increased from 3 mm to 6 mm), the soundproofing effectiveness of the soundproof member (3) was improved for the sound of low frequency and high frequency. When the thickness of the structural element was decreased from 3 mm to 1 mm, the soundproofing effectiveness of the soundproof member (5) was obviously degraded for the sound of low frequency and high frequency. The soundproofing effectiveness of the soundproof member (2) having a structural element thickness of 3 mm was about two times for the sound of low frequency and high frequency compared to the soundproofing effectiveness of the soundproof member (5) having a structural element thickness of 1 mm. In addition, the soundproofing effectiveness of the soundproof member (5) having two composite films disposed on the top surface and the bottom surface of the structural element for the sound of low frequency and high frequency was even worse than the soundproofing effectiveness of the soundproof member (1) having only one composite film disposed on the bottom surface of the structural element.

Example 5

Example 5 was similar to Example 3, and the difference in Example 5 was the composite films (5) being replaced with the composite films (6) to obtain a soundproof member (6). Subsequently, the sound transmission loss (STL) at different frequencies of the soundproof member (6) was measured according to the standard ASTM E2611-09, and the measurement result is shown in Table 3.

Comparative Example 2

Comparative Example 2 was similar to Example 3, and the difference in Comparative Example 2 was the composite films (5) being replaced with the polyvinyl alcohol films to obtain a soundproof member (7). The polyvinyl alcohol films had a circle shape, a surface area of 23.4 cm², and a thickness of about 50 µm. The PVA films were prepared by following steps: 100 parts by weight of polyvinyl alcohol (PVA having Mn of about 80000, commercially available from First Chemical Group) and 110 parts by weight of solvent (deionized water) were mixed to obtain a composition. Subsequently, the composition was poured into a mold, and baked to remove the solvent for obtaining a PVA film. Subsequently, the sound transmission loss (STL) at different frequencies of the soundproof member (7) was measured according to the standard ASTM E2611-09, and the measurement result is shown in Table 3.

TABLE 3

| | Composite film content | Structural element thickness | Composite film location | Sound transmission loss at frequency of less than 500 Hz (db) | Sound transmission loss at frequency of 630 Hz to 4000 Hz (db) |
|---|---|---|---|---|---|
| Example 3 | PVA/GO (weight ratio = 100:40) | 6 mm | At the bottom surface and the top surface of the structural element | 49.9 | 44.9 |
| Example 5 | PVA/GO (weight ratio = 100:20) | 6 mm | At the bottom surface and the top surface of the structural element | 43.3 | 35 |
| Comparative Example 2 | PVA | 6 mm | At the bottom surface and the top surface of the structural element | 6.5 | 22.4 |

As shown in Table 3, when the ratio of graphene oxide flake to PVA is decreased from 40:100 to 20:100, the soundproof member (6) still had a sound transmission loss at low frequency of 43 dB. In addition, when the composite films disposed on the top surface and the bottom surface of the structural element were replaced with the PVA films, the soundproofing effectiveness of the soundproof member (7) for the sound of high frequency was reduced to be less than half times (compared to the soundproof member (3) in Example 3). The sound transmission loss at low frequency of the soundproof member (7) was even only 6.5 dB.

Example 6

Example 6 was similar to Example 3, and the difference in Example 6 was the number of through holes per unit area of the structural element being decreased from 4.32 holes/cm² to 0.98 holes/cm² to obtain a soundproof member (8). Subsequently, the sound transmission loss (STL) at different frequencies of the soundproof member (8) was measured according to the standard ASTM E2611-09, and the measurement result is shown in Table 4.

TABLE 4

| | Composite film content | Structural element thickness | Composite film location | Number of through holes per unit area of the structural element (holes/cm²) | Sound transmission loss at frequency of less than 500 Hz (db) | Sound transmission loss at frequency of 630 Hz to 4000 Hz (db) |
|---|---|---|---|---|---|---|
| Example 3 | PVA/GO (weight ratio = 100:40) | 6 mm | At the bottom surface and the top surface of the structural element | 4.32 | 49.9 | 44.9 |
| Example 6 | PVA/GO (weight ratio = 100:40) | 6 mm | At the bottom surface and the top surface of the structural element | 0.98 | 43.6 | 29.8 |

As shown in FIG. 4, the soundproofing effectiveness of the composite films of the same area can be improved by increasing the number of through holes per unit area of the composite film.

Example 7

A structural element composed of polylactic acid was provided, which had a circular shape, a surface area of 23.4 cm², and a thickness of about 10 mm. The structural element had a plurality of through holes arranged in an array. The through holes had the same horizontal cross-sectional area, and a horizontal cross section of quadrilateral shape. The structural element had a number of through holes per unit area of 4.32 holes/cm². Subsequently, the composite film (7) from Preparation Example 7 was cut to obtain a circular composite film (7) with a surface area of 23.4 cm². Subsequently, the two cut composite films (7) were respectively disposed on the bottom surface and the top surface of the structural element to be in direct contact with the bottom surface and the top surface of the structural element to obtain a soundproof member (9). As such, terminals of all the through holes at the top surface of the structural element were sealed by the composite film (7) disposed on the top surface of the structural element, and terminals of all the through holes at the bottom surface of the structural element were sealed by the composite film (7) disposed on the bottom surface of the structural element. Subsequently, the sound transmission loss (STL) at different frequencies of the soundproof member (9) was measured according to the standard ASTM E2611-09, and the measurement result is shown in Table 5.

Example 8

A structural element composed of aluminum was provided, which had a circular shape, a surface area of 23.4 cm$^2$, and a thickness of about 10 mm. The structural element had a plurality of through holes arranged in an array. The through holes had the same horizontal cross-sectional area, and a horizontal cross section of quadrilateral shape. The structural element had a number of through holes per unit area of 4.32 holes/cm$^2$. Subsequently, the composite film (8) from Preparation Example 8 was cut to obtain a circular composite film (8) with a surface area of 23.4 cm$^2$. Subsequently, the two cut composite films (8) were respectively disposed on the bottom surface and the top surface of the structural element to be in direct contact with the bottom surface and the top surface of the structural element to obtain a soundproof member (10). As such, terminals of all the through holes at the top surface of the structural element were sealed by the composite film (8) disposed on the top surface of the structural element, and terminals of all the through holes at the bottom surface of the structural element were sealed by the composite film (8) disposed on the bottom surface of the structural element. Subsequently, the sound transmission loss (STL) at different frequencies of the soundproof member (10) was measured according to the standard ASTM E2611-09, and the measurement result is shown in Table 5.

TABLE 5

| | Composite film content | Structural element thickness | Composite film location | Number of through holes per unit area of the structural element (holes/cm$^2$) | Sound transmission loss at frequency of less than 500 Hz (db) | Sound transmission loss at frequency of 630 Hz to 4000 Hz (db) |
|---|---|---|---|---|---|---|
| Example 7 | PVA/GO/HNT (weight ratio = 100:40:5) | 10 mm | At the bottom surface and the top surface of the structural element | 4.32 | 41.7 | 48.3 |
| Example 8 | Lamination of the polymer layer and the graphene oxide | 10 mm | At the bottom surface and the top surface of the structural element | 4.32 | 38.4 | 40.0 |

As shown in Table 5, the nanotube could be added into the composite film to obtain the soundproof member with good soundproofing effect. In addition, the lamination of the polymer layer and the graphene oxide layer serving as the composite film could obtain the soundproof member with good soundproofing effect.

Example 9

Figure 17:
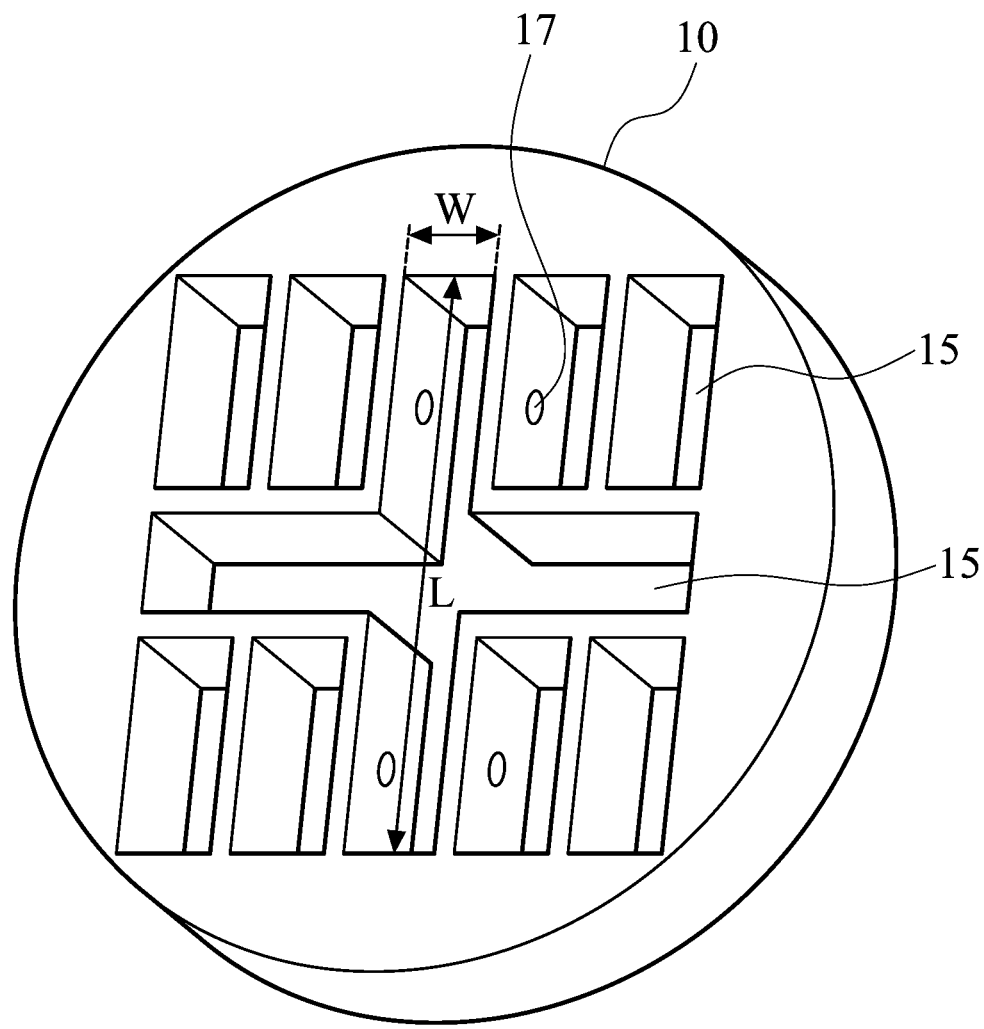
FIG. 17 shows a structural element used in a soundproof member (11) in Example 9.

A structural element composed of polylactic acid was provided, which had a circular shape, a surface area of 23.4 cm$^2$, and a thickness of about 6 mm. FIG. 17 shows the structural element in Example 9, in which the structural element 10 had one cross shaped through hole 15 (having a length L of 35 mm and a width W of 5.2 mm). The structural element was divided to four regions by the cross shaped through hole, and a plurality of through holes having the same size, 13.68 mm×4.56 mm, were disposed in each of the four regions. Four circular holes 17 of 2 mm were disposed on the sidewall of the cross shaped through hole.

Subsequently, the composite film (9) from Preparation Example 9 was cut to obtain a circular composite film (9) with a surface area of 23.4 cm$^2$. Subsequently, the two cut composite films (9) were respectively disposed on the bottom surface and the top surface of the structural element to be in direct contact with the bottom surface and the top surface of the structural element to obtain a soundproof member (11). As such, terminals of all the through holes at the top surface of the structural element were sealed by the composite film (9) disposed on the top surface of the structural element, and terminals of all the through holes at the bottom surface of the structural element were sealed by the composite film (9) disposed on the bottom surface of the structural element. Subsequently, the sound transmission loss (STL) at different frequencies of the soundproof member (11) was measured according to the standard ASTM E2611-09, and the measurement result is shown in Table 6.

Example 10

Example 10 was similar to Example 9, and the difference in Example 10 was all the used composite films (9) being replaced with the composite films (11) to obtain a soundproof member (12). Subsequently, the sound transmission loss (STL) at different frequencies of the soundproof member (12) was measured according to the standard ASTM E2611-09, and the measurement result is shown in Table 6.

TABLE 6

| | Composite film content | Structural element thickness | Composite film location | Sound transmission loss at frequency of less than 500 Hz (db) | Sound transmission loss at frequency of 630 Hz to 4000 Hz (db) |
|---|---|---|---|---|---|
| Example 9 | PVA/clay (weight ratio = 100:30) | 6 mm | At the bottom surface and the top surface of the structural element | 32.3 | 32.4 |
| Example 10 | PEI/GO (weight ratio = 100:40) | 6 mm | At the bottom surface and the top surface of the structural element | 41.5 | 44.2 |

It will be clear that various modifications and variations can be made to the disclosed methods and materials. It is intended that the specification and examples be considered as exemplary only, with the true scope of the disclosure being indicated by the following claims and their equivalents.

What is claimed is:

1. A soundproof member, comprising:
   a structural element, wherein the structural member includes at least one through hole passing through the structural element and extending in a first direction, and the first direction is perpendicular to a bottom surface of the structural element; and
   a first composite film disposed on the bottom surface of the structural element, wherein the first composite film includes at least one first micro cavity, wherein the first micro cavity is disposed in the first composite film and extends in a second direction, and the second direction is parallel to the bottom surface of the structural element and perpendicular to the first direction, wherein the first composite film has a porosity of 30% to 60%, wherein the first micro cavity has a maximum length L1 in the first direction, the first micro cavity has a maximum length L2 in the second direction, and L1/L2 is 0.01 to 0.5.

2. The soundproof member as claimed in claim 1, wherein the first composite film comprises a polymer material and an inorganic nanoscale material.

3. The soundproof member as claimed in claim 2, wherein the inorganic nanoscale material and the polymer material have a weight ratio of 1:10 to 2:1.

4. The soundproof member as claimed in claim 1, wherein the structural element includes a plurality of through holes, and the number of through holes per unit area of the structural element is 0.05 holes/cm$^2$ to 10.0 holes/cm$^2$.

5. The soundproof member as claimed in claim 1, wherein the structural element has a thickness of 1.5 mm to 20 mm.

6. The soundproof member as claimed in claim 1, wherein the first composite film has a thickness of 10 μm to 1 mm.

7. The soundproof member as claimed in claim 2, wherein the polymer material comprises polyimide, nylon, polyaramide, polybenzimidazole, polyether sulfone, polyetherimide, polyacrylonitrile, polyethyleneimine, polyethylene terephthalate (PET), polypropylene, polyaniline, polyethylene oxide, polyethylene naphthalate (PEN), polybutylene terephthalate (PBT), styrene butadiene rubber (SBR), polystyrene, polyvinyl chloride, polyvinyl alcohol, polyvinylidene fluoride, polyvinyl butene, polycarbonate, or a combination thereof.

8. The soundproof member as claimed in claim 2, wherein the inorganic nanoscale material comprises a one-dimensional inorganic nanoscale material, a two-dimensional inorganic nanoscale material, or a combination thereof.

9. The soundproof member as claimed in claim 2, wherein the first composite film is a film composed of a mixture of the polymer material and the inorganic nanoscale material.

10. The soundproof member as claimed in claim 9, wherein the inorganic nanoscale material and the polymer material have a weight ratio of 1:10 to 1:1.

11. The soundproof member as claimed in claim 2, wherein the first composite film is a lamination containing a first layer and a second layer, wherein the first layer comprises the inorganic nanoscale material, and the second layer comprises the polymer material.

12. The soundproof member as claimed in claim 11, wherein the first layer and the second layer have a thickness ratio of 1:10 to 10:1.

13. The soundproof member as claimed in claim 11, wherein the first layer further comprises a polymer additive, and the polymer additive has a weight percentage of 0.1 wt % to 10 wt % on the basis of the weight of the first layer.

14. The soundproof member as claimed in claim 1, further comprising a second composite film disposed on a top surface of the structural element, wherein the second composite film comprises a polymer material and an inorganic nanoscale material.

15. The soundproof member as claimed in claim 1, wherein the first micro cavity in the first composite film has a total volume of V1, the first composite film has a volume of V, and V1/V is 0.03 to 0.6.

16. The soundproof member as claimed in claim 1, wherein the first composite film further comprises at least one second micro cavity, wherein the second micro cavity has a maximum length L3 in the first direction, the second micro cavity has a maximum length L4 in the second direction, and L3/L4 is greater than 0.5, wherein the second cavity in the first composite film has a total volume of V2, the first composite film has a volume of V, and V2/V is less than 0.05.

17. A soundproof member, comprising:
   a structural element, wherein the structural member includes at least one through hole passing through the structural element; and
   a first composite film disposed on a bottom surface of the structural element, wherein the first composite film comprises a polymer material and an inorganic nanoscale material, wherein the first composite film has a porosity of 30% to 60%, wherein the inorganic nanoscale material and the polymer material have a weight ratio of 1:10 to 2:1.

18. The soundproof member as claimed in claim 17, wherein the inorganic nanoscale material comprises a one-dimensional inorganic nanoscale material, a two-dimensional inorganic nanoscale material, or a combination thereof.

19. The soundproof member as claimed in claim 17, wherein the first composite film is a film composed of a mixture of the polymer material and the inorganic nanoscale material, and the inorganic nanoscale material and the polymer material have a weight ratio of 1:10 to 1:1.

20. The soundproof member as claimed in claim 17, wherein the first composite film is a lamination containing a first layer and a second layer, wherein the first layer comprises the inorganic nanoscale material, the second layer comprises the polymer material, and the first layer and the second layer have a thickness ratio of 1:10 to 10:1.

* * * * *